Jan. 28, 1936.   G. W. JOHNSON   2,029,104
PRESSING MACHINE-RECIPROCATING TYPE
Filed June 10, 1935
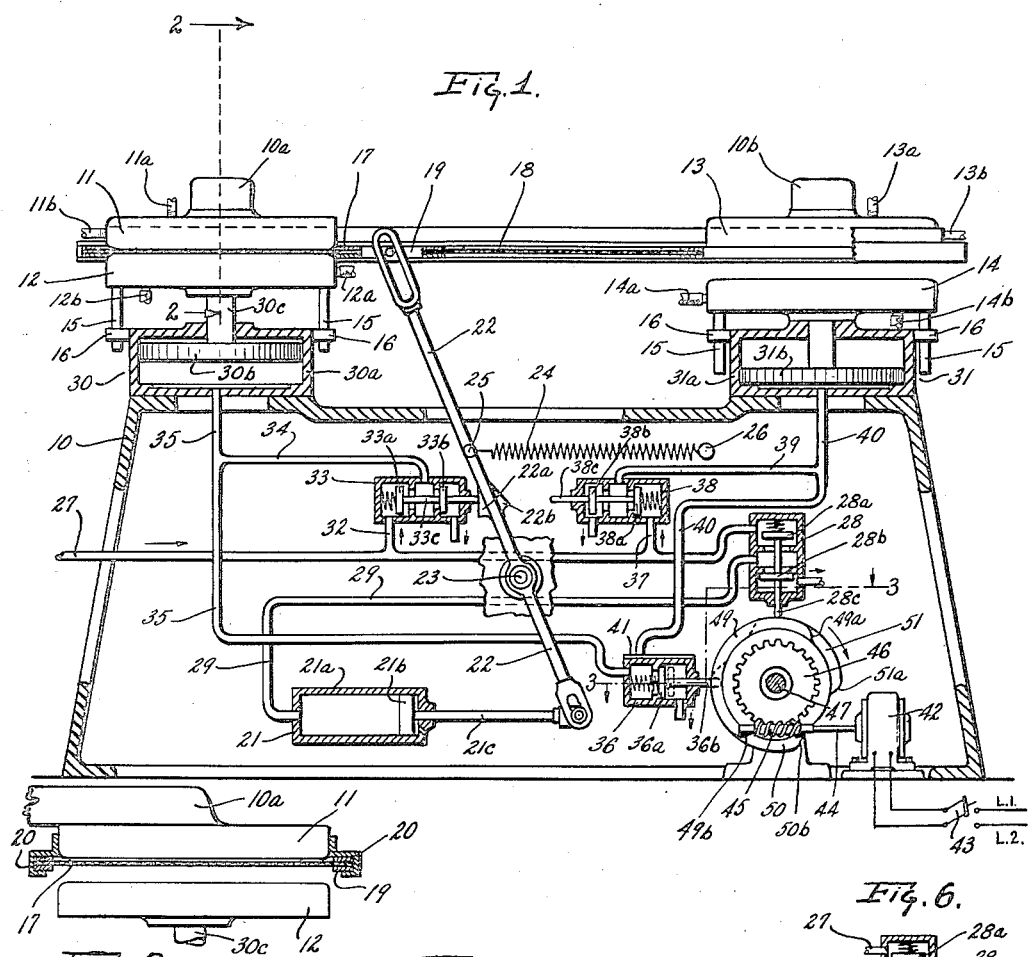
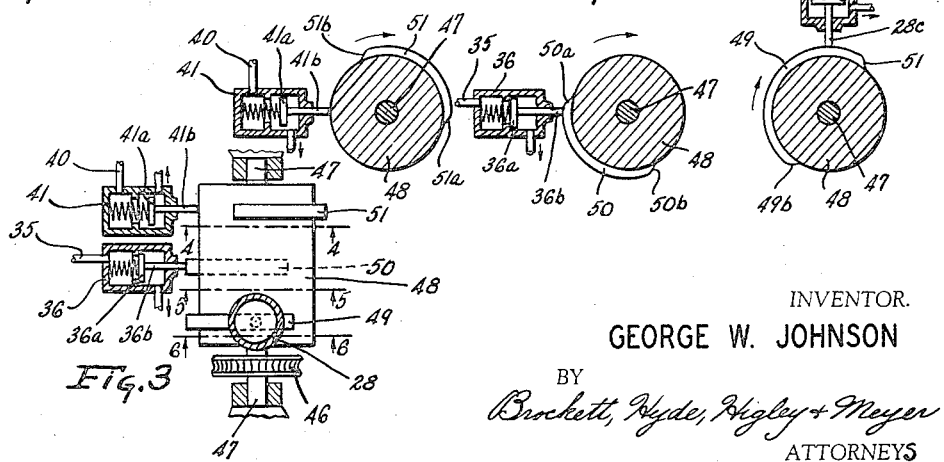
INVENTOR.
GEORGE W. JOHNSON
BY
Brockett, Hyde, Higley & Meyer
ATTORNEYS Patented Jan. 28, 1936

2,029,104

UNITED STATES PATENT OFFICE 2,029,104

PRESSING MACHINE—RECIPROCATING TYPE

George W. Johnson, Cincinnati, Ohio, assignor to The American Laundry Machinery Company, Norwood, Ohio, a corporation of Ohio Application June 10, 1935, Serial No. 25,786

17 Claims. (Cl. 68—9)

This invention relates to a pressing machine of the type generally used in laundry and garment work and more particularly to a machine having a plurality of horizontally spaced pairs of pressing members, with means for alternately moving a work carrying member into pressing position between the pressing members of each pair while simultaneously moving a processed article to exposed position between the pairs.

My invention provides improved mechanism for a pressing machine of the above described type and includes improved mechanism for moving the work carrying members to position articles alternately between the pressing members of each pressing pair and other mechanism for closing and opening the pressing members upon an article placed between them.

Another feature of my invention is the provision of improved control mechanism for a pressing machine of the type described including continuously operating automatic control mechanism for continuously repeating the cycle, comprising moving the work carrier in one direction to place an article in pressing position between one pair of pressing members, closing and opening that pair of pressing members upon the article between them, moving the work carrying mechanism in the opposite direction to place an article between the other pair of pressing members, and closing and opening the other pair of pressing members upon the article between them. It results from this improved control that all that is necessary for the operator to do is to place unprocessed articles upon and to remove processed articles from the work carrying tray or other means when in exposed position between the pairs of pressing members. This type of machine is advantageous for speeding up pressing operations as the machine operates in a fixed cycle and the operator must work in timed relation to the cycle of the machine.

My improved pressing machine is particularly applicable to the processing of starchless collars and particularly to that step in the process wherein layers of fabric are cemented together by a cellulose derivative previously softened by a suitable solvent and then subjected to a heating and pressing operation during which the cellulose derivative cements the layers of fabric together. To this end my improved mechanism provides pairs of pressing members, each of which may be heated to a suitable degree and the articles to be processed, such as shirt collars, may be placed upon suitable work carrying trays, each comprising a single layer of wire gauze supported by a suitable frame.

Other features of my invention comprise suitable structure including motor means and control members therefor for moving the work carrying articles into and out of pressing position between the respective pairs of pressing members and suitable motor mechanism for closing and opening the pressing members. Other features include the control mechanism for carrying out the movements of the pressing machine automatically, including the timing of the period during which the pressing members remain closed so that each article may receive exactly the same treatment.

The novel features included in my invention are more fully set forth in the drawing and specification and the essential features will be summarized in the claims.

In the drawing, Fig. 1 is an elevation partly in section of a pressing machine embodying my invention, including the control mechanism therefor shown diagrammatically; Fig. 2 is a section through one of the pairs of pressing members along the line 2—2 of Fig. 1; Fig. 3 is a plan view partly in section of a portion of the mechanism of Fig. 1 and taken along the line 3—3 of Fig. 1; Figs. 4, 5 and 6 are sectional views along similarly numbered lines of Fig. 3.

The drawing shows a pressing machine comprising a frame 10 supporting two pairs of coacting relatively movable pressure producing members 11 and 12 comprising one pair, and 13 and 14 comprising the other pair. These pressure producing pairs may be pressing platens as shown but my invention also includes platens carried into and out of pressing position between two pressure producing members, for instance my disclosure includes a construction in which the members 12 and 14 might be movable laterally into and out of position above their respective pressure producing pistons. In the embodiment shown, each pressure producing pair comprises relatively movable coacting pressing members movable into and out of pressure engagement for the carrying out of a pressing operation upon an article placed between them. If necessary or desirable to heat the pressing members they may be formed hollow with provisions for the inlet and outlet of a heated fluid medium, the inlets in each case being designated by the suffix "a" and the outlets by the suffix "b". Either or both of the pressing members of each pair may be movable but in the present instance the members 11 and 13 are fixed upon bracket portions 10a and 10b respectively, while the members 12 and 14 are guided for limited vertical movement relative to the frame by means of pins 15 which enter suitable bores in brackets 16 connected with the fixed portion of the frame.

Means is provided for carrying articles into and out of pressing position between the pairs of pressing members and the means provided comprises trays 17 and 18 mounted on a suitable frame 19 so that they move as a unit. The parts are so arranged and proportioned that when one tray is in pressing position between one of the pairs of pressing members the other tray is in exposed position between the pairs of pressing members so that the operator may remove processed articles or place thereon articles to be processed. Suitable means is provided for guiding the work carrying trays and in the present instance guide rails 20 extend between the fixed pressing members in a manner to receive the tray frame 19 therebetween. This arrangement allows the reciprocation of the trays into and out of pressing position closely adjacent the fixed pressing member and the wire portion of the tray provides sufficient movement to permit the bed member of the pressing pair to carry the article on the tray into ironing engagement with the fixed head.

Suitable means is provided for reciprocating the tray frame 19 backward and forward to alternately position each tray between its respective pressing members. The means shown comprises a motor 21 having a cylinder 21a in which reciprocates a piston 21b whose piston rod 21c has a suitable pin and slot connection with a lever 22 which in turn is pivotally mounted on the frame at 23. The upper end of lever 22 has a suitable pin and slot connection with the tray frame 19. A spring 24 connected at 25 with the upper portion of lever 22 and at 26 connected with the frame biases the tray frame 19 in its right hand position, that is to say, with tray 18 between pressing members 13 and 14 and with tray 17 in the intermediate or exposed position. When fluid is supplied to cylinder 21a to move piston 21b to the right into the position shown in Fig. 1, spring 24 is extended and the upper portion of lever 22 moves to the left to the position of Fig. 1, that is to say, with tray 17 in pressing position between members 11 and 12 and with tray 18 in the exposed position. Fluid supply for motor 21 is by way of conduit 27, valve casing 28 and conduit 29. Valve casing 28 houses a normally closed inlet valve 28a and a normally open outlet valve 28b, both mounted upon a common stem 28c by which they may be actuated in the manner later described.

Means is provided for closing and opening each pair of pressing members. The means shown comprises motors 30 and 31 which are alike so that only one need be described. Motor 30 comprises a cylinder 30a housing a piston 30b whose piston rod 30c engages bed 12 and the stroke of piston 30b is sufficient to raise the bed into pressure engagement against the head. Upon the release of pressure beneath piston 30b, gravity acting upon the parts moves the bed downward out of pressing relation. The supply of motive fluid to motor 30 is by way of conduit 32, valve casing 33 and conduits 34 and 35. Valve casing 33 houses a normally closed inlet valve 33a and a normally open outlet valve 33b upon a common stem 33c by which the valves are actuated. Conduit 35 leads to a valve casing 36 which houses a normally open outlet valve 36a having a stem 36b by which it may be actuated. In a similar manner motive fluid is supplied to motor 31 through conduit 37, valve casing 38 and conduits 39 and 40. The valves in casing 38 are similar to those in casing 33 and are similarly designated. Conduit 40 leads to a valve casing 41 which is similar to valve casing 36 and houses a normally open exhaust valve 41a having a stem 41b.

Means is provided for insuring that, of the motors 30 and 31, only that one is operable for a pressing operation which has a tray in pressing position between the pair of pressing members operated by it. To this end valve casings 33 and 38 are so positioned that the valves therein are moved to their "on" position, that is to say, with the outlet valve closed and the inlet valve open as shown in connection with valve casing 33 in Fig. 1 when lever 22 has moved the associated tray into pressing position. That is to say, on lever 22 are abutments 22a and 22b adapted to engage valve stems 33c and 38c respectively, when each tray is in pressing position. However, this actuation of the valves in casings 33 and 38 is insufficient to actuate the motors 30 and 31 respectively, because of the normally open outlet valves 36a and 41a. These valves are controlled by the continuously operating control and timing mechanism next described.

An electric motor 42 is electrically connected with a source of power L1, L2, by a control switch 43. The motor drives a shaft 44 upon which is a worm 45 engaging a worm gear 46 which in turn is rigid with a shaft 47 mounted in suitable bearings in the frame. The motor turns the shaft and the associated parts in the direction shown by the arrows in the various figures. On shaft 47 is a cam carrying drum 48, the cam portions of which are designated respectively 49, 50 and 51. Cam 49 is adapted to engage valve stem 28c and extends around substantially half the circumference of the drum 48 so that during approximately one-half of the revolution of the drum the valves in casing 28 are held in the operated position shown in Figs. 1 and 6 for the supply of motive fluid to motor 21 which holds tray 17 in its left-hand or pressing position. Shortly after the shoulder 49a of cam 49 has actuated valve stem 28c, the shoulder 50a of cam 50 engages the stem 36b to close valve 36a and effectively supply motive fluid to motor 30 whose other control valves in casing 33 have been preset by movement of lever 22 to its counterclockwisemost position as shown in Fig. 1. Upon completion of a pressing operation caused by motor 30, valve stem 36b passes off the shoulder 50b of cam 50 thus opening the exhaust valve for motor 30 and permitting a recession of bed member 12 and shortly thereafter valve stem 28c passes off the shoulder 49b of cam 49, thus deenergizing motor 21 and permitting spring 24 to move tray 17 out of pressing position while simultaneously moving tray 18 toward the right and into pressing position between members 13 and 14. Such movement of lever 22 engages valve stem 38c and actuates the valves in casing 38 to their "on" position, that is, to close the outlet valve and open the inlet valve. Shortly thereafter shoulder 51a of cam 51 engages valve stem 41b and closes valve 41a so as to effectively supply motive fluid to motor 31 for a pressing operation thereby. Upon completion of this pressing operation, stem 41b passes off the shoulder 51b of cam 51 causing a release of pressure from motor 31 and a recession of bed member 14. Shortly thereafter shoulder 49a of cam 49 again engages valve stem 28c and the trays are moved toward the left as viewed in Fig. 1 for a repetition of the cycle.

What I claim is:

1. In a pressing machine, two spaced pairs of coacting pressure producing members, means for actuating each pair of members in pressure-producing and pressure-releasing directions, work-carrying means movable alternately in two directions, each movement being adapted to position an article to be pressed between one pair of pressure members and simultaneously to move a pressed article from the other pair of pressure members to exposed position, and continuously operating control mechanism having operative connections with said work-carrying means and with each of said pair-actuating means for causing continuous repetition of a cycle including movement of the work-carrying means in one direction to place an article between one pair of members, actuation of that pair of pressure producing members in pressure-producing and pressure-releasing directions, movement of the work-carrying means in the other direction, and actuation of the other pair of pressure producing members in pressure-producing and pressure-releasing directions.

2. In a pressing machine, two spaced pairs of coacting relatively movable pressing members, means for relatively moving each pair of pressing members to close and open the same, a pair of work trays movable alternately in two directions, each movement being adapted to place one tray in pressing position between one pair of pressing members and to expose the other tray, tray moving means, and continuously operating control mechanism having operative connections with said tray moving means and with each pressing pair moving means for causing continuous repetition of a cycle including movement of the tray moving means in one direction, closing and opening of the pressing pair having a tray in pressing position, movement of the tray moving means in the other direction, and closing and opening of the other pressing pair with its associated tray in pressing position.

3. In a pressing machine, two horizontally-spaced pairs of coacting relatively movable pressing members, a pair of work holding trays movable as a unit alternately in two directions to place each of said trays in turn in pressing position between its associated pair of pressing members, the parts being so arranged that as each tray is placed in pressing position the other tray is moved to exposed position between the pressing pairs, means for so moving said trays, and means for closing and opening each pair of pressing members when a tray lies between them.

4. In a pressing machine, two horizontally-spaced pairs of coacting relatively movable pressing members, means for heating said pressing members, a pair of work holding trays movable as a unit alternately in two directions to place each of said trays in turn in pressing position between its associated pair of pressing members, each tray consisting of a frame and a single layer of wire gauze supported thereby, the parts being so arranged that as each tray is placed in pressing position the other tray is moved to exposed position between the pressing pairs, means for so moving said trays, and means for closing and opening each pair of pressing members when a tray lies between them.

5. In a pressing machine, two horizontally-spaced pairs of coacting pressing members, each pair comprising a fixed member and a movable member, a pair of work holding trays movable as a unit alternately in two directions to place each of said trays in turn in pressing position between its associated pair of pressing members, the parts being so arranged that as each tray is placed in pressing position the other tray is moved to exposed position between the pressing pairs, means for guiding each tray into pressing position adjacent the fixed pressing member of the respective pairs, means for moving said trays, and means for moving the movable member of each pair into and out of pressing engagement with its coacting fixed member.

6. In a pressing machine, two horizontally-spaced pairs of coacting pressing members, each pair comprising a fixed member and a movable member, a pair of work holding trays movable as a unit alternately in two directions to place each of said trays in turn in pressing position between its associated pair of pressing members, the parts being so arranged that as each tray is placed in pressing position the other tray is moved to exposed position between the pressing pairs, guide rails extending between and supported by said fixed pressing members for guiding each tray into pressing position adjacent the fixed pressing member of the respective pairs, means for moving said trays, and means for moving the movable member of each pair into and out of pressing engagement with its coacting fixed member.

7. In a pressing machine, two horizontally spaced pairs of coacting pressure producing members, each pair comprising a fixed head member and a movable member, means for actuating the movable member of each pair including a vertically acting cylinder and piston motor positioned beneath each head member, work-carrying means movable alternately in two directions, each movement being adapted to position an article to be pressed between one pair of pressure members and simultaneously to move a pressed article from the other pair of pressure members to exposed position between the pairs, means for moving said work-carrying means first in one direction, then in the other direction; and means, actuated by movement of said work-carrying means in each direction and upon the placing of an article in pressing position between each of said pressure producing pairs, for actuating the associated motor in pressure-producing direction.

8. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, a motor for actuating said work-carrying means, and valve means for each fluid actuated means, said valve means associated with each pressure-producing pair being arranged for automatic actuation upon movement of an article between the members of the pair by movement of the work-carrying means.

9. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, motor means for moving said work-carrying means into each of its positions and for holding it there for an interval of time, and valve means for each fluid actuated means actuable in pair-closing direction by movement of said work-carrying means to position an article between its associated pressure-producing pair.

10. In a pressing machine, two horizontally-spaced pairs of coacting relatively movable pressure producing members, means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, means for actuating said work-carrying means, control means for each pair-moving means and normally disabled, and means enabling each control means upon movement of an article into pressing position between its associated pressure producing pair of members.

11. In a pressing machine, two horizontally-spaced pairs of coacting relatively movable pressure producing members, power means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, means for actuating said work-carrying means, supply means for each power means, control means for each supply means each including two control members both of which must be actuated effectively to supply power to a power means, a device for actuating one of said members, and means actuating the other of said members only when an article is in pressing position between the pair of pressure members closed by the associated power means.

12. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, means for actuating said work-carrying means, fluid supply means for each of said first-named means and including two valves both of which must be actuated to supply effective pressure to its associated fluid actuated means, a device for actuating one of said valves, and means actuating the other of said valves only when an article is in pressing position between the pair of pressure members closed by the associated fluid actuated means.

13. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, means for actuating said work-carrying means, fluid supply means for each of said first-named means and including two valves both of which must be actuated to supply effective pressure to its associated fluid actuated means, a timing device for opening and closing one of said valves, and means actuating the other of said valves only when an article is in pressing position between the pair of pressure members closed by the associated fluid actuated means.

14. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, means for actuating said work-carrying means, fluid supply means including a normally closed inlet valve and a normally open outlet valve for each fluid actuated means, means for opening each inlet valve when an article has been moved between the pair of pressure members closed by the fluid actuated means energized by said inlet valve, and a timing device for closing and opening each exhaust valve.

15. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, a motor for alternately moving said work-carrying means into and for holding the said means in each of its two positions for an interval of time, fluid supply means for each fluid actuated means and each including a pair of valves both of which must be actuated effectively to supply fluid to the associated means, means for opening one of the valves of a pair when an article has been moved between the pair of pressure members closed by the fluid actuated means associated with said valve, and a device for actuating the other valve of said pair in timed relation with the operation of said motor.

16. In a pressing machine, two horizontally-spaced pairs of coacting relatively movable pressure producing members, fluid pressure actuated means for relatively moving each pair to close and open the same for pressing an article between them, work-carrying means movable alternately into two positions, said means being so arranged that each positioning thereof places an article in pressing position between the members of one pair and simultaneously moves another article from pressing position between the other pair to exposed position between the pairs, a single-acting cylinder and piston motor adapted when energized for moving said work-carrying means into one of its two positions, means urging said work-carrying means into the other of its two positions when said motor is deenergized, fluid supply means for said motor including control valves, means for alternately holding said valves in motor-engaging and motor-deenergizing position for predetermined time intervals, fluid supply means for each fluid actuated means and each including a pair of valves both of which must be actuated effectively to supply fluid to the associated means, means for opening one of the valves of a pair when an article has been moved between the pair of pressure members closed by the fluid actuated means associated with said valve, and a device for actuating the other valve of said pair in timed relation with the operation of said motor control valves.

17. In a pressing machine, two horizontally-spaced pairs of coacting pressing members, each pair comprising a stationary head member and a movable bed member, fluid pressure actuated means for each pair for raising each bed member into pressure engagement with its coacting head member, work-carrying means comprising a pair of work trays movable as a unit alternately into two positions, said work-carrying means being so arranged with respect to said pairs of pressing members that movement of the said means into each position places one tray between a pair of pressing members and places the other tray in exposed position between the pairs, a single-acting cylinder and piston motor adapted when energized for moving said work-carrying means into one of its two positions, means for moving said work-carrying means into the other of its positions when said motor is deenergized, fluid supply means for said motor including control valves, fluid supply means for each fluid actuated means including a control valve and means actuated only when a work tray is between the pressing members actuated by the associated fluid means, and continuously operating cam means for alternately holding said first-named control valves in energized and deenergized position for pre-determined periods of time, said cam means also actuating the second-named control valve for the fluid actuated means for the pair of pressing members having a tray between them.

GEORGE W. JOHNSON.